April 19, 1960  G. K. HAUSE  2,932,939
HYDRAULIC TORQUE CONVERTER
Filed July 13, 1956  4 Sheets-Sheet 2
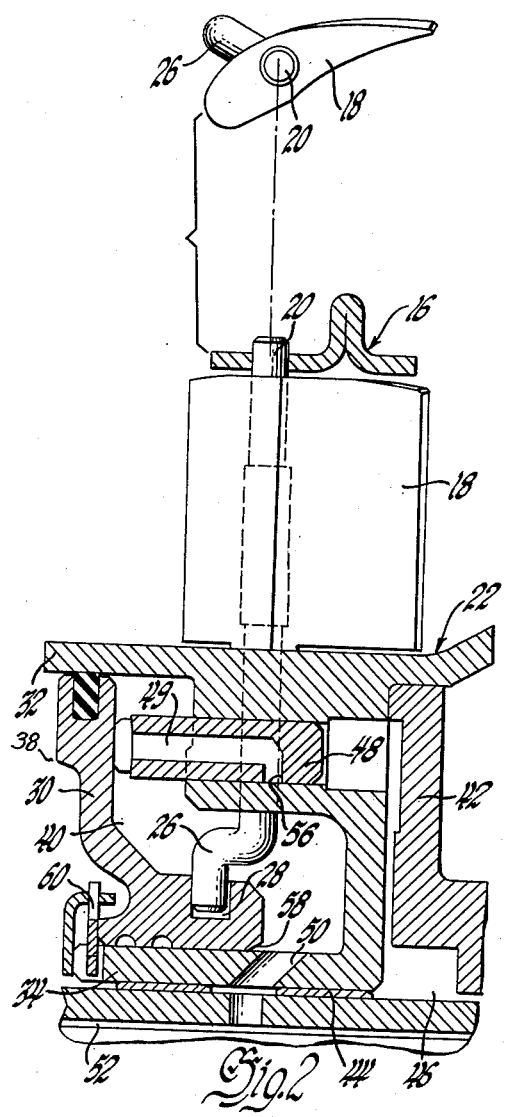
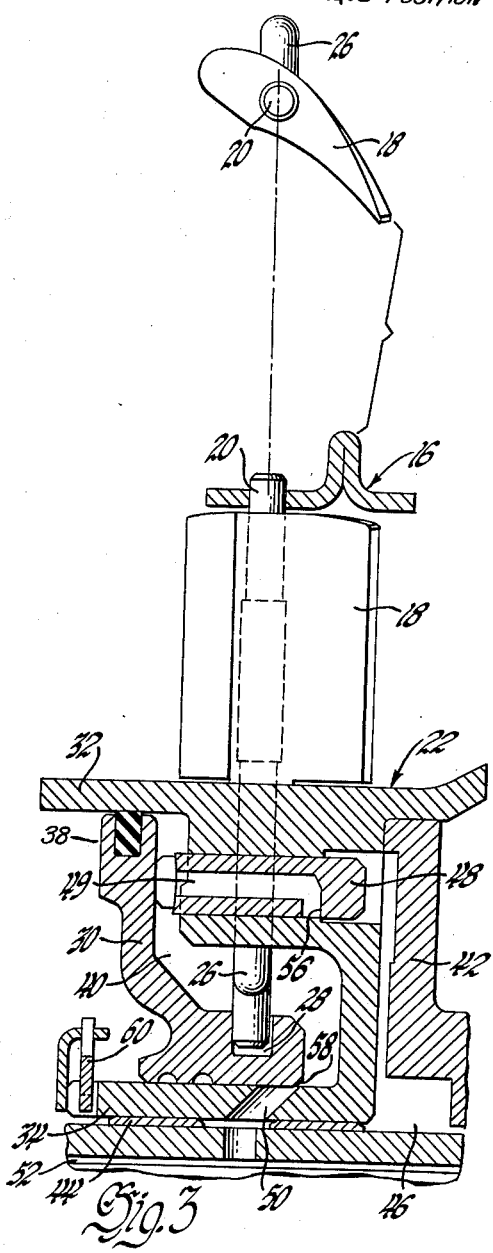
INVENTOR.
Gilbert K. Hause
BY
T. L. Chisholm
ATTORNEY

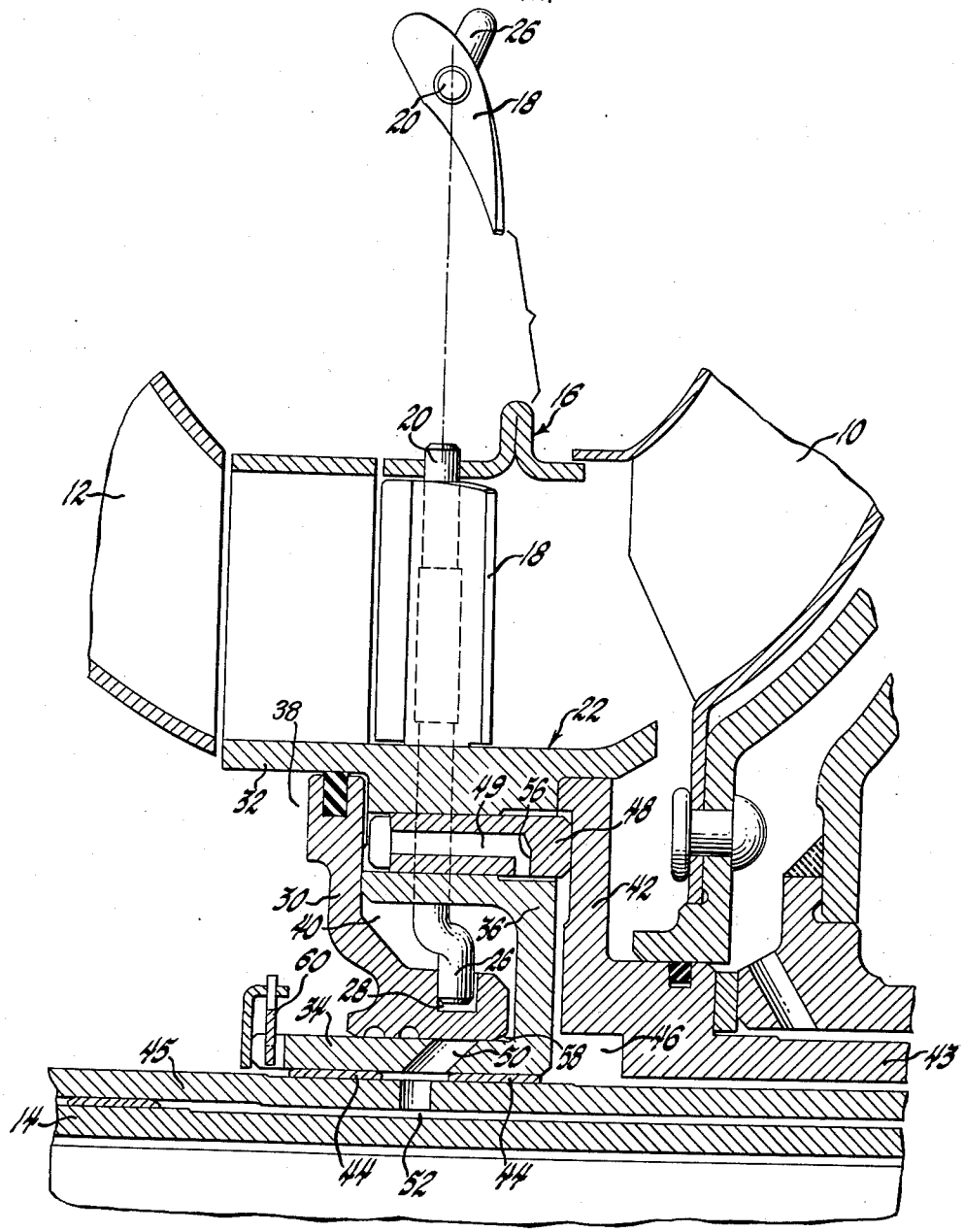

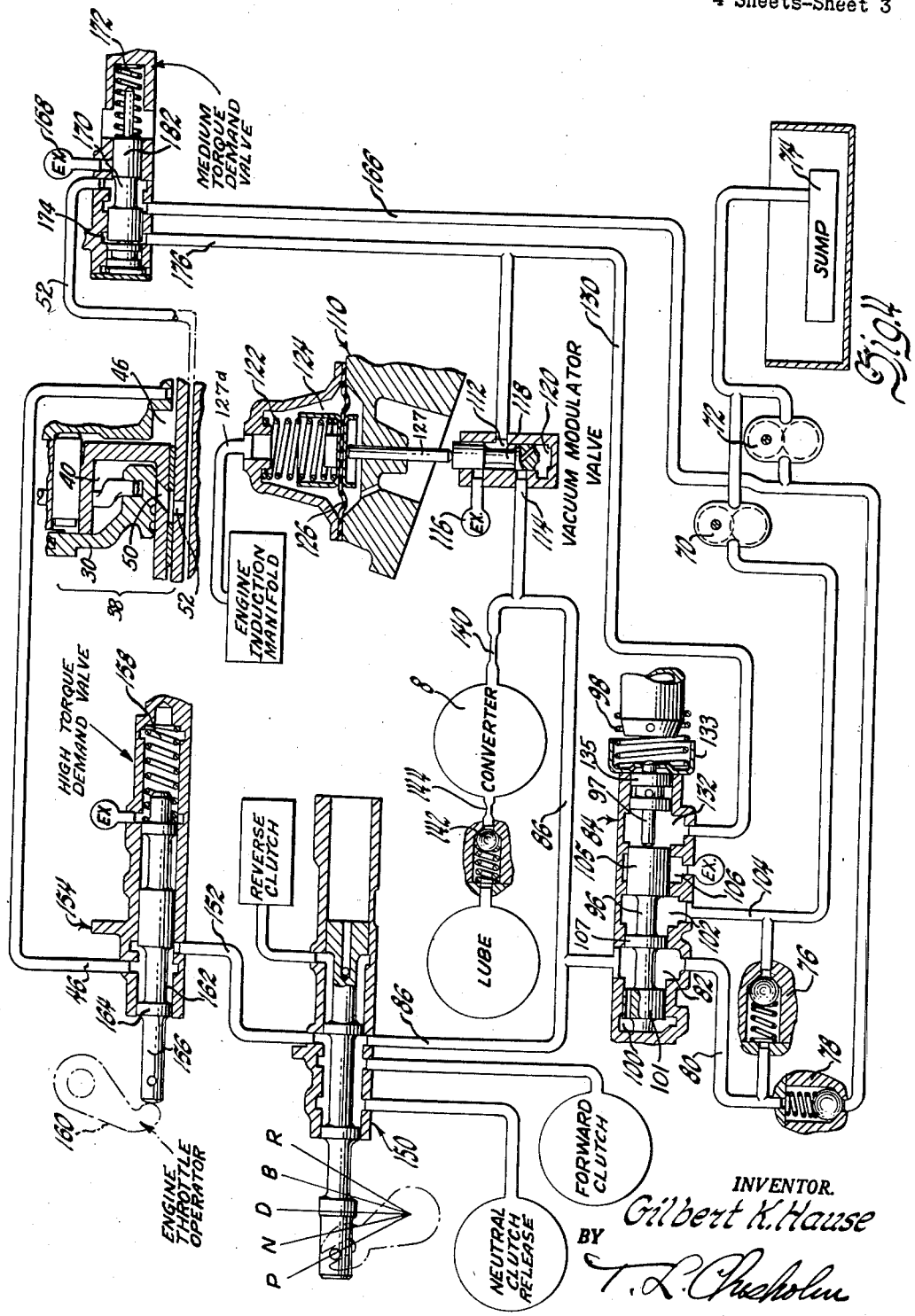

United States Patent Office 2,932,939
Patented Apr. 19, 1960

2,932,939

HYDRAULIC TORQUE CONVERTER

Gilbert K. Hause, Franklin, Mich., assignor to General Motors Corporation, Detroit, Mich., a corporation of Delaware Application July 13, 1956, Serial No. 597,736

21 Claims. (Cl. 60—12)

This invention relates to hydrodynamic torque transmitting devices of the type in which liquid is circulated in a closed path through a bladed impeller and one or more bladed turbines to transmit torque from the impeller to the turbine means. It is particularly adapted to torque converters, that is, those torque transmitting devices which multiply torque, and is illustrated herein as embodied in such a torque converter, but the invention is not limited to torque converters and some features of it are applicable to hydrodynamic torque transmitting devices generally. Also the invention is particularly, though not exclusively, adapted to torque transmitting devices used as transmissions or as components of transmissions in automobiles and the invention is shown herein as so applied, but only as an example.

In known hydrodynamic torque transmitting devices in general, and especially hydrodynamic torque converters, the angular positions of the blades of one or more of the bladed members, such as turbines or reaction members, have been adjustable so as to vary the amount of torque transmitted from the input member or impeller to the output member or turbine. In torque converters, this varies the range of torque ratio effected by the converter, permits higher engine speed and hence more power input. This invention includes among its objects the provision of improved and simplified and reliable means and method of control for varying the positions of the adjusting member which controls the torque in a torque transmitting device. The invention is especially, though not exclusively, adapted to controlling the blades of the reaction member, guide wheel, or stator of a torque converter. More specific objects of the invention are to provide an improved control system for adjusting the blades of a torque converter in a transmission of an automobile according to the torque demand of the vehicle at any time, and to insure increase of the torque ratio of the torque converter whenever the vehicle is started from rest, or is driven in reverse.

Other objects and advantages of the invention will be apparent from the following description and from the accompanying drawings.

Fig. 1 is in part structural and in part diagrammatic, the structural part being one half of a symmetrical axial section of a reaction member and its blade operating mechanism, and the diagrammatic part showing a blade in the position of highest angle;

Fig. 2 is a diagrammatic and sectional view like Fig. 1 but with the blade at lowest angle;

Fig. 3 shows the blade in an intermediate position;

Fig. 4 is a hydraulic diagram to a control system, and

Figure 5:
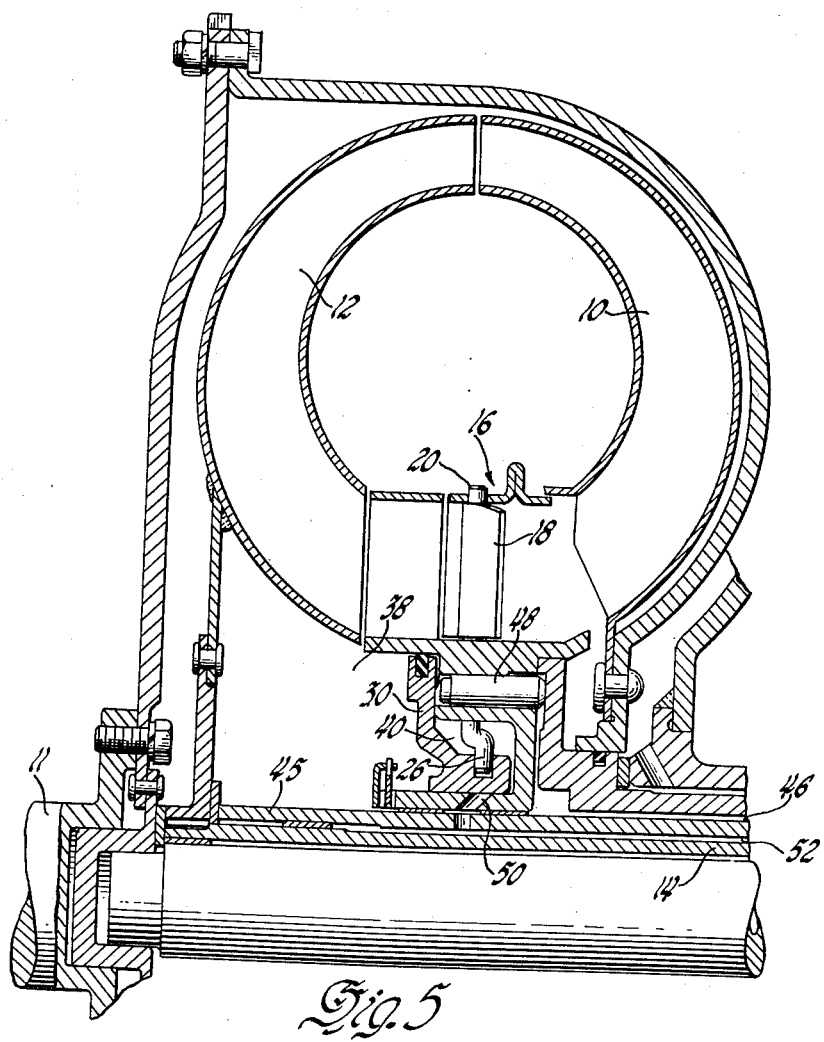
Fig. 5 is a diagrammatic representation of one-half of a symmetrical axial section of an otherwise conventional torque converter having an adjustable reaction member embodying my invention.

The torque converter may include an impeller driven by an engine, a turbine driven hydraulically by the impeller and driving change speed and/or reversing gearing which drives propeller shaft of an automobile, and a reaction member, guide wheel or stator, as shown for example in the United States patent to Kelley 2,727,360, issued December 20, 1955, the disclosure of which is incorporated herein by reference. Preferably the blades of the reaction member are angularly adjustable as is known, and as is shown for example in British Patent 750,788 published June 20, 1956. The torque converter in general may be of any known or suitable form, and as is usual it may include a closed container represented by 8 in Figs. 4 and 5, containing a bladed impeller or input member 10 driven by the engine shaft 11, a bladed turbine or output member 12 which is adapted to drive a hollow shaft 14 which may be considered the output shaft of the torque converter, and a reaction device, guide wheel or stator designated as a whole by 16 between the outlet of the turbine and the intake of the impeller. Shaft 14 lies in the axis of rotation of the entire device and is an axis of symmetry in Figs. 1, 2, 3 and 5. The reaction member has reaction or guide blades 18 mounted on spindles 20 by which the angular positions of the blades may be adjusted. The spindles 20 are mounted in any suitable annular support 22 which may be, but is not necessarily, rotatable about the axis of rotation in the sense of rotation of the impeller and turbine but in any event cannot rotate backward. The converted is filled with liquid under pressure from any suitable pump. The apparatus as so far described is known and the particular form of the elements referred to are immaterial to the present invention.

As shown in Figs. 1–3, each spindle 20 has a crank arm 26 disposed in an annular groove 28 in an annular piston 30 which slides in an annular open-ended cylinder form by the following three walls: outer cylindrical wall 32 joined to an inner cylindrical wall 34 by an annular radial wall 36. The cylinder is divided by the piston 30 into two pressure chambers 38 and 40, forming with the piston two expansible chamber motors for positioning the crank arms 26 and blades 18. The radial wall 36 is secured to a flange 42 integral with or attached to a sleeve 43 which may be connected to any suitable free wheeler, not shown, for permitting forward rotation of the stator as a whole and preventing reverse rotation. The inner wall 34 is supported for rotation by bearing sleeves 44 supported on a fixed tubular shaft 45 surrounding the shaft 14.

When the piston is as far to the right as it will go, which position is shown in Fig. 1, the blades 18 are held at their highest angle or position of highest performance, which is the position in which they turn through a relatively large angle the oil flowing from the turbine 12 to the impeller 10 which effects the highest range of torque ratios between the impeller and turbine. When the piston is as far to the left as it will go, which position is shown in Fig. 2, the blades are at their lowest angle, in which position they redirect oil through the lowest angle which gives the lowest range of torque multiplication in the converter.

The expansible chamber 38 is open to the interior of the torque converter so that the static pressure in the torque converter constantly urges the piston to the right, as Fig. 1 is seen. In case the area of each blade 18 on the downstream side of the pivot 20 is greater than the area on the upstream side, as is the case in the torque converter herein illustrated, the hydraulic force of liquid flowing past the blades tends to move them into the position of lowest angle. In this case, I control the static pressure in the torque converter and select the area of the piston 30 so that the force of the piston can overcome any hydraulic force on the blades to hold them in highest angle position, as shown in Fig. 1.

Oil under pressure can be supplied to the chamber 40 through a supply passage 46 under the control of a valve 48, which is slidable in the wall 36, and has a restricted through passage 49 into the chamber 40 and oil can also be supplied to the chamber 40 through a mid-position port 50 in the inner wall 34 from a passage 52. Whenever oil is supplied through both passages 46 and 52, at a higher pressure than the converter pressure, the chamber 40 is completely filled and the piston is held in the position of Fig. 2 so that the blades are at the lowest angle.

When oil is supplied to the chamber 40 through the supply passage 46 alone, the passage 52 being vented, the chamber 40 is partly filled and the piston is held in the position of Fig. 3, holding the blades at a medium angle. This is accomplished as follows. When oil is first supplied to passage 46 at a pressure higher than converter pressure, the piston 30 begins to move to the left. The valve or plug 48 follows the piston because the pressure on the right end of the valve is greater than the pressure on its left end. This is because the pressure on its left end is that of oil flowing from its right end through restricted passage 49 in the valve into expansible chamber 40, which is expanding. When the piston reaches mid-position, the corner or edge 56 of the position-responsive valve 48 just closes communication between passages 46 and 49, stopping further flow of oil into the chamber 40, and the edge 58 of the piston begins to uncover the port 50. If passage 52 is not supplied with liquid and is vented, the plug 48 and piston 30 together act as a position-responsive regulator valve which begins to function where the piston reaches mid-position and thereafter maintains in the chamber 40 a pressure just balancing the forces tending to move the blades to high angle. Thus, if the pressure of the torque converter rises or that of supply conduit 46 falls, the piston tends to move to the right, but this closes port 50 and opens supply passage 49 slightly to admit more liquid from passage 46 which increases the pressure in chamber 40 and moves the piston to the left again until the passage 49 is closed. On the other hand, if the torque converter pressure falls and the piston moves too far to the left, the corner 56 closes supply passage 46 and the corner or edge 58 of the piston opens the vent port 50 to some extent so that liquid is drained from the cylinder through passage 52, reducing the pressure in chamber 40 and allowing the converter pressure to move the piston back to the right. As soon as vent port 50 is closed again by the corner 58 of the piston, further drainage is prevented and the piston is held in the mid-position.

In order to place the blades in low angle, it is necessary to supply oil at greater pressure that the torque converter pressure to both passages 46 and 52. Valve 48 closes the passage 46 when the piston reaches mid position, and the pressure in conduit 46 holds it closed. Simultaneously the port 50 is opened and pressure of oil admitted through port 50 then moves the piston all the way to the left, as shown in Fig. 2, which is the position of low angle.

To place the stator at its intermediate angle, passage 52 is vented while passage 46 is supplied. This lets converter pressure and pressure in conduit 46 cooperate to move or hold the piston in the position of Fig. 3. When it reaches the latter, the edge 58 of the piston is in position to hover between just closing and just opening the vent port 50 and the valve 48 is in position to hover between just opening and just closing passage 49. As before described, the device regulates the pressure in chamber 40 to maintain the piston in this position.

To move the blades to high angle, both passages 52 and 46 are vented, and converter pressure in chamber 38 moves the piston 30 all the way to the right, as shown in Fig. 1.

Passage 46 includes the annular space between the hollow shafts 43 and 45 and this communicates with the control system as shown in Fig. 4. The passage 52 is prevented from communicating with the passage 46 and with the interior of the torque converter by the bearing sleeves 44 which effectively form seals.

It will be understood that seals such as formed by the bearing sleeves 44 need not be pressure tight and, in fact, they usually are not. Considerable leakage may occur past a bearing sleeve and yet the bearing may effectively seal off a passage, for example, because any leakage is constantly made up by the excess capacity of the system for supplying liquid under pressure, as is known. It is sufficient as here where large quantities of liquid are constantly available from pumps, as will be explained, that such a bearing prevents a passage from leaking too fast, or that the bearing maintain a sufficient difference of pressure between two spaces, as the case may be. The passage 52 communicates with the control system as shown in Fig. 4. Piston 30 is held in the cylinder by a retainer or snap ring 60.

*Control system*

The structure described above can be operated by any suitable controls which may select the desired direction of drive and the speed ratios in any suitable gearing as shown, for example, in the Kelley patent referred to, and which places the stator blades in the desired positions either manually or automatically, or both. One example of controls embodying my invention is shown diagrammatically in Fig. 4.

The source of pressure for keeping the torque converter filled with liquid, for lubrication, for actuating the servos which control the gearing, and for controlling the system generally includes a front pump 70 driven by the engine and a rear pump 72 driven by the output shaft of the vehicle, both of which pumps take in oil from a sump 74 and deliver it at high pressure through any suitable pressure regulating valve which normally tends to maintain a predetermined substantially uniform pressure in a main line 86. One known form of a suitable pressure regulating valve is diagrammatically represented in its entirety by 84 in Fig. 4. This includes a regulated pressure chamber 82 connected through a common inlet 80 to the two pumps through check valves 76 and 78. The arrangement of the check valves is such that when either pump is operating alone, that pump supplies oil through its check valve to the inlet 80, the other check valve being closed by the pressure in the inlet 80 to prevent loss of pressure through the idle pump. The rear pump delivers oil under pressure only when the car is running forward.

The pressure regulator valve 84 has a valve stem 96 constantly urged to the left as Fig. 4 is seen by a pin 97 attached to a cap 133 constantly urged to the left by a spring 98. The valve 84 also includes a pressure regulating chamber 100 which is connected to the regulated pressure chamber 82 as is known, for example by the customary restricted passage in a land 101 which separates the regulating chamber 100 from the regulated chamber 82. Pressure in the regulating chamber 100 urges the valve stem to the right with a force which is proportional to the pressure in the main line 86. The front pump outlet is also connected by a line 104 independent of the check valves to a pump selector chamber 102 in the pressure regulator valve 84. When the pressure of oil flowing from both pumps 70 and 72 reaches a predetermined value, which occurs when the engine is driving the car forward at a predetermined speed, pressure in the regulating chamber 100 moves the stem 96 to the right far enough to permit a land 105 to uncover an exhaust port 106 and thus vent the pump selector chamber 102. When this occurs the pressure delivery outlet of the front pump is vented to reduce or eliminate pressure maintained by the front pump in order to reduce the load on the engine. Then the rear pump supplies the requirements of the system through check valve 78, check valve 76 being closed. Thereafter the pressure regulator valve tends to maintain a constant pressure in the line 86 which may be, for example 100 pounds per square inch. If the pressure tends to become higher than this, the force of the pressure in the regulating chamber 100 on the land 101 moves the valve stem 96 to the right far enough for a land 107 to establish communication between regulated pressure chamber 82 and pump selector chamber 102 which is vented at port 106 by land 105. This vents to the sump any excess flow from the rear pump and reduces the pressure in the line 86 to the desired value. If the pressure in the line 86 tends to fall below the desired value the pressure in chamber 100 permits the spring 98 to move the valve stem 96 to the left until the land 107 reduces or closes communication between the regulated chamber 82 and exhaust port 106 until the pressure again reaches the desired value at which time the excess from the rear pump is again vented past the land 107, as above described.

The pressure normally maintained in the line 86 by the spring 98 and regulated pressure chamber 100 may be increased in response to torque demand on the engine by any suitable form of torque-demand-responsive regulator valve. One example of such regulator valve is represented diagramatically by the valve 110. This includes a modulated pressure chamber 112 to which oil can be admitted from the main line 86 at an inlet 114 and from which oil can be vented at an exhaust port 116 under the control of a valve stem 118. The valve stem 118 is urged upward, as Fig. 4 is seen, to close the inlet 114 and open the vent 116 by the pressure of oil in a modulating chamber 120 connected to the modulated chamber 112 in any suitable manner as by a restricted opening in the lower land of the valve stem 118. The valve stem 118 is urged down as Fig. 4 is seen to close the exhaust port 116 and open the inlet 114 by a spring 122, acting on a flexible diaphragm 126, which can push a pin 127 down to push the valve stem down. The spring 122 is contained in a closed chamber 124, one side of which is formed by the diaphragm 126 and this chamber is connected to the induction manifold of the engine by any suitable conduit 127a. The lower side of the diaphragm 126 is exposed to the atmosphere. This arrangement, as is known, maintains a pressure in the modulated pressure chamber 112 which is a measure of manifold pressure and hence of torque demand on the engine. When the torque demand is low vacuum in the engine induction manifold is high, that is, the pressure in the chamber 124 is low so that less pressure in the chamber 124 opposes atmospheric pressure on the diaphragm 126 and this reduces the effective force of the spring and so reduces the pressure maintained in the chamber 112, as is known.

Modulated pressure chamber 112 is connected by a conduit 130 to a pressure modulating chamber 132 in the main pressure regulator valve 184 where any pressure due to the modulated pressure chamber 112 exerts force on the right side of land 105 and thus assists the spring 98 in urging the valve stem 96 to the left. The spring 98 acts on pin 97 which slides freely in a stationary partition 135. Any pressure in chamber 112 increases the force in the regulating chamber 100 which is required to relieve the chamber 82 through chambers 102 and 106 and this maintains a higher pressure in the main line than would be maintained by the spring 98 alone. This modulated pressure in the main line is increased with high torque demand on the engine and is decreased with low torque demand on the engine. The modulator 110 is an illustration of a well-known device for maintaining in chamber 112 and all space connected to it such as chamber 132 a pressure which is a measure of the torque demand on the engine.

Oil is supplied from the main line 86 to the converter, as shown in Fig. 4, through an inlet conduit of carefully selected controlling cross section. This is represented by the fixed orifice or passage 140, and oil is led from the converter to lubricate the various parts of the apparatus through a pressure-responsive release valve 142. This arrangement tends to maintain a substantially constant static pressure in the torque converter which is below that of main line pressure and may be, for example, thirty pounds per square inch, and this is the pressure which operates in the space 38 to the left of the piston in Fig. 1 and urges the blades 18 to a position of highest angle.

As will be shown, the blades are moved to intermediate or high angle in response to high torque demand on the engine, and as pointed out above, this results in higher engine speed. Higher engine speed increases the flow in the torque converter from the impeller through the turbines, and this increases the hydraulic force urging the blades to low angle. To counteract this increased force, I provide means for increasing the static pressure in the torque converter whenever the blades are to be moved from lowest angle.

The release valve 142 normally tends to maintain a constant static pressure in the converter in spite of variations in line pressure due to the modulator. It does so, in fact, if oil can flow out of the converter faster than it can flow into it. To increase the pressure in the torque converter when it is desired to move the blades toward a higher angle, I use an outlet passage from the converter to the release valve 142 which restricts the flow to a lower rate than the flow through the inlet to the converter and to a lower rate than the capacity of the relief valve 142. This is done by selecting a controlling cross section, represented by the restricted passage 144 in Fig. 4 which is materially less than that of the inlet passage 140. For example, the passage 140 may have an effective or controlling diameter of about $3/16$ of an inch while the diameter of 144 is about $1/10$ of an inch. Then when the pressure in the main line is increased, the rate of flow into the converter is increased and the restriction 144 builds up pressure in the converter which is a function of torque demand.

A manual selector valve 150 of any suitable form may direct oil from main line to various servos for controlling the gearing such as neutral clutch, forward clutch, reverse clutch, or forward clutch release, so labeled in the diagram Fig. 4. The manual valve always conducts oil from the main line 86 to a conduit 152 leading to a high torque demand stator control valve generally denoted by 154. This includes a valve stem 156 which is urged to the right against a return spring 158 by an arm 160 forming part of or connected to the throttle operator of the engine so that the position of the valve stem 156 is an indication of the amount of throttle opening. The high torque demand stator control valve includes a chamber 162 communicating with the conduit 152 and supplying oil from main line 86 to the passage 46 which, as previously described, leads through control passage 49 to the space 40 of the blade control cylinder. Oil is supplied to the passage 46 in all positions of the throttle from idling to full throttle and this holds the stator blades here in mid position when the port 50 is not supplied with oil and holds them in the low angle position when the port 50 is supplied with oil as explained above. Whenever the throttle is moved past wide-open position, a land 164 in the stator control valve is positioned between the connections of conduits 46 and 152 so that the conduit 46 and the stator cylinder 40 are vented through the opened end of the stator control valve around the valve stem 156. This empties the cylinder 40 and allows the pressure in the converter to hold the stator blades 18 in the highest angle, as is shown in Fig. 1.

The medium torque demand control valve is shown in the upper right-hand corner of Fig. 4. The stator port 50 and the conduit 52, previously described, are arranged either to be connected with an outlet 166 of the rear pump 72 which is independent of the check valves 76 and 78 and independent of regulator valve 84, or to be vented thru an exhaust port 168 by a valve stem 170 which is urged to the left to connect line 166 to passage 52 by a spring 172 and may be urged to the right against the spring to close conduit 166 and connect conduit 52 to exhaust port 168 by an expansible chamber 174 connected to the modulated pressure line 130 by a conduit 176. Thus, the stator port 50 is connected to the rear pump whenever the torque demand is low, for example, as indicated by a vacuum gauge reading in the engine intake manifold of more than six to eight inches of mercury. This allows pressure in chamber 40 to move the piston 30 fully to the left as seen in Fig. 2 and to hold the stator blades in low angle. The port 50 is vented when the torque demand of the engine is increased beyond this point to effect the regulating action of valve 48 and edge 58 of the piston and so hold the blades in medium angle and increase the performance of the torque converter.

On the valve stem 170, the land 180 which opens and closes the line 166 is larger in diameter than the land 182 which opens and closes the exhaust port 168 so that when oil is admitted to the passage 52, the excess area of land 180 provides a force which assists the spring 172. This provides hysteresis, assuring different values of opening and closing the conduit 166, as is known.

On starting the car, the rear pump 72 is not pumping. Consequently, the stator port 50 is not supplied with oil and the blades are positioned in medium angle to provide a medium range of torque multiplication although conduit 166 is connected to conduit 52. On starting the car forward at light throttle, after the car has attained a predetermined speed, pressure of rear pump 72 builds up sufficiently to move the stator blades to low angle. Thereafter, the car will operate with the blades in low angle unless and until the control system moves the blades to medium or high angle, as explained above.

It is noted that whenever line 46 is vented, line 52 is also vented because line 46 cannot be vented except at full throttle which reduces manifold pressure and closes line 166 and vents line 52.

In all reverse drives, the blades remain in medium angle unless moved to high angle by flooring throttle pedal because the pump 72 does not provide oil when running backward.

I claim as my invention:

1. In a hydrodynamic device for transmitting torque, the combination of a hydrodynamic torque input member, a hydrodynamic torque output member on which torque is impressed by the input member, a movable adjusting element for varying the torque transmitted between the input and output members, the torque transmitting device including means for urging the adjusting element toward a first position providing one torque transmitting condition and including a fluid pressure chamber having means connected to the adjusting element for opposing movement of the adjusting element toward the first position by the urging means, an inlet passage and a vent passage for the chamber, means for supplying to the inlet passage fluid under pressure sufficient to overcome the urging means and to move the adjusting element to a second position providing a different torque transmitting condition, and control means responsive to the position of the adjusting element for controlling the effective areas of both passages to regulate the pressure in the chamber and thereby hold the adjusting element approximately in the second position.

2. In a hydrodynamic device for transmitting torque, the combination of a hydrodynamic torque input member, a hydrodynamic output member on which torque is impressed by the input member, a movable adjusting element for varying the torque transmitted between the input and output members, the torque transmitting device including means for urging the adjusting element toward a first position providing one torque transmitting condition, and including a fluid pressure chamber having means connected to the adjusting element for opposing movement of the adjusting element toward the first position by the urging means, an inlet passage and a vent passage for the chamber, means for supplying to the inlet passage fluid under pressure sufficient to overcome the urging means and move the adjusting element to a second position providing a different torque transmitting condition, and control means responsive to the position of the adjusting element for controlling the passages to hold the adjusting element approximately in the second position, said position responsive control means including mean for closing the inlet passage when the adjusting element approaches said second position and means for opening the vent passage when the adjusting element moves beyond said second position.

3. In a hydrodynamic device for transmitting torque, the combination of a hydrodynamic torque input member, a hydrodynamic torque output member on which torque is impressed by the input member, a movable adjusting element for varying the torque transmitted between the input and output members, the torque transmitting device including means for urging the adjusting element toward a first position providing one torque transmitting condition and including a fluid pressure chamber having means connected to the adjusting element for opposing movement of the adjusting element toward the first position by the urging means, an inlet passage and a vent passage for the chamber, means for supplying to the inlet passage fluid under pressure sufficient to overcome the urging means and move the adjusting element to a second position providing a different torque transmitting condition, and control means responsive to the position of the adjusting element for controlling the passages to hold the adjusting element approximately in the second position, said position responsive control means including means for closing the inlet passage when the adjusting element approaches said second position and means for opening the vent passage when the adjusting element moves beyond said second position, and additional means for closing the vent passage and for admitting to the vent passage fluid under pressure to move the adjusting means to a third position providing a third torque transmitting condition between the members.

4. In a hydrodynamic device for transmitting torque, the combination of a hydrodynamic torque input member, a hydrodynamic torque output member on which torque is impressed by the input member, a movable adjusting element for varying the torque transmitted between the input and output members, the torque transmitting device including means for urging the adjusting element toward one position providing one torque transmitting condition, and including an expansible chamber having means connected to the adjusting element for opposing movement of the adjusting element toward the first position by the urging means, an inlet passage and a vent passage for the chamber, means for supplying to the passages fluid under pressure sufficient to overcome the urging means and move the adjusting element to another position providing another torque transmitting condition between the members, means responsive to the position of the adjusting element for opening and closing the inlet passage, means for interrupting the supply to the vent passage and opening the vent passage to permit the urging means to move the adjusting element toward said one position, and means responsive to the position of the adjusting member for closing the vent when the adjusting member reaches an intermediate position providing an intermediate torque transmitting condition.

5. A transmission comprising in combination a hydrodynamic device for transmitting torque to a hydrodynamic torque output member from a hydrodynamic torque input member driven by a prime mover, a movable adjusting element for varying the torque transmitted between the input and output members, the torque transmitting device including means for urging the adjusting element toward one position providing one torque transmitting condition and including a fluid pressure chamber having means connected to the adjusting element for opposing movement of the adjusting element toward the first position by the urging means, an inlet passage and a vent passage for the chamber, means for supplying to the passages fluid under pressure sufficient to overcome the urging means and move the adjusting element to another position providing another torque transmitting condition between the members, means responsive to the position of the adjusting element for opening and closing the inlet passage, control means connected to the prime mover which control means is responsive to the torque demand on the prime mover for interrupting the supply to the vent passage and for opening the vent passage to permit the urging means to move the adjusting element toward said one position when the torque demand on the prime mover reaches a predetermined value, and means responsive to the position of the adjusting member for closing the vent when the adjusting member reaches an intermediate position providing an intermediate torque transmitting condition.

6. In a hydrodynamic device for transmitting torque, the combination of a hydrodynamic torque input member, a hydrodynamic torque output member, a movable adjusting element for varying the torque transmitted between the input and output members, the torque transmitting device including means for urging the adjusting element toward a first position providing one torque transmitting condition and including a fluid pressure chamber having means connected to the adjusting element for opposing movement of the adjusting element toward the first position by the urging means, an inlet passage for the chamber, means for supplying to the passage fluid under pressure sufficient to overcome the urging means and to move the adjusting element to a second position providing a different torque transmitting condition, control means responsive to the position of the adjusting element for restricting said passage when the element is in said second position, a second passage into the chamber, and means for supplying to the second passage fluid under pressure sufficient to move the adjusting means against the urging means from the second position to a third position providing a third torque transmitting condition.

7. In a hydrodynamic device for transmitting torque, the combination of a hydrodynamic input member driven by an engine, hydrodynamic torque output member on which torque is impressed by the input member, a movable adjusting element for varying the torque transmitted between the input and output members, the torque transmitting device including means for urging the adjusting element toward a first position providing relatively high torque between the members and including a fluid pressure chamber having means connected to the adjusting element for opposing movement of the adjusting element toward the first position by the urging means, an inlet passage and a vent passage for the chamber, means normally supplying to the inlet passage fluid under pressure sufficient to overcome the urging means and move the adjusting element toward a second position providing lower torque between the members, means responsive to the position of the adjusting element for closing the inlet passage to the chamber when the element approaches the second position and for opening the vent passage when the element moves beyond the second position, control means connected to the engine which is responsive to the torque demand thereon and means responsive both to forward rotation of the output member above a predetermined speed and to said control at a predetermined low torque demand on the engine for supplying to the vent passage fluid under pressure sufficient to move the adjusting element to a third position providing still lower torque between the members.

8. In a hydrodynamic device for transmitting torque, the combination of a hydrodynamic torque input member, a hydrodynamic torque output member on which torque is impressed by the input member, means including a movable adjusting element for varying the torque transmitted between the input and output members, the torque transmitting device including means for urging the adjusting element toward a first position providing relatively high torque between the members and including a fluid pressure chamber having means connected to the adjusting element for opposing movement of the adjusting element toward the first position by the urging means, an inlet passage and a vent passage for the chamber, means normally supplying to the inlet passage fluid under pressure sufficient to overcome the urging means and to move the adjusting element toward a second position providing lower torque between the members, means responsive to the position of the adjusting element for closing the inlet passage to the chamber when the element approaches the second position and for opening the vent passage when the element moves beyond the second position, and means responsive to forward rotation of the output member above a predetermined speed for supplying to the vent passage fluid under pressure sufficient to move the adjusting element to a third position providing still lower torque between the members.

9. In a hydrodynamic device for transmitting torque, the combination of a hydrodynamic torque input member, a hydrodynamic torque output member on which torque is impressed by the input member, means including a movable adjusting element for varying the torque transmitted between the input and output members, the torque transmitting device including means for urging the adjusting element toward a first position providing one torque transmitting condition and including two relatively movable members defining a fluid pressure chamber for opposing movement of the adjusting element toward the first position by the urging means, one of said relatively movable members being connected to the adjusting element; a passage in one member of the chamber for supplying to the chamber fluid at a pressure sufficient to overcome the urging means to move the adjusting element to a second angular position providing a different torque transmitting condition, and a valve in said one member of the chamber responsive to the positions of the other member of the chamber to restrict said passage when the motor positions the adjusting element in the second position.

10. In a hydrodynamic device for transmitting torque, the combination of a hydrodynamic torque input member, a hydro-dynamic torque output member, a movable adjusting element for varying the torque transmitted between the input and output members, the torque transmitting device including means for urging the adjusting element toward a first angular position providing one torque transmitting condition and including two relatively movable members defining a fluid pressure chamber for opposing the urging means, one of said relatively movable members being connected to the adjusting element; a passage in one member of the chamber for supplying to the chamber fluid at a pressure sufficient to overcome the urging means to move the adjusting element to a second angular position providing a different torque transmitting condition, and a valve in said one member of the chamber responsive to the positions of the other member of the chamber to open and close said passage respectively in response to slight variations in the position of the adjusting element on either side of said second position.

11. A device of the character described including in combination a hydrodynamic torque transmitting device which circulates liquid to transmit torque from an input member to an output member, a movable adjusting element for influencing the torque between the input and output members, the torque transmitting device including means constantly urging the adjusting element toward a position of high torque, an expansible chamber for opposing the urging means, means for supplying to the chamber fluid at a pressure sufficient to overcome the urging means to move the adjusting element to a position of low torque, said last-mentioned means including a fluid supply passage, a vent for the chamber, and control means responsive to the position of the element for controlling the supply passage and the vent, the control means being constructed and arranged to close the vent and open the supply passage when the control means reaches a predetermined position of intermediate torque in passing from low torque position to high torque position, and to open the vent and close the supply passage when the control means reaches a predetermined position of intermediate torque in passing from high torque position to low torque position.

12. The combination of a hydrodynamic torque converter which circulates liquid to transmit torque from an input element to an output element; means in the path of the liquid having angularly adjustable blades whose angular positions influence the torque between the input and output elements, the torque converter including means yieldingly urging the blades toward a first angular position; means for opposing the urging means and for moving the blades to a second angular position, said last-mentioned means including an expansible chamber having a wall and a piston in the chamber connected to the blades; means for supplying fluid to the chamber at a pressure sufficient to overcome the urging means and to move the blades to a second angular position, said last mentioned means including a supply passage in said wall; a valve in the passage urged toward the piston by the pressure in the supply passage and restricting the passage when the piston positions the blades in a third angular position between the first and second positions.

13. The combination of a hydrodynamic device for transmitting torque from an input to an output member, a movable adjusting element for varying the torque transmitted between the input and output members, the torque transmitting device including means for urging the adjusting element toward a first position providing one torque transmitting condition, a chamber for opposing the urging means, the chamber including a piston traveling in a cylinder and connected to the adjusting element, a first port in the end of the cylinder, a slide valve in the cylinder which controls the port, means for supplying to the port fluid under pressure sufficient to overcome the urging means and move the piston to move the adjusting element, the slide valve being urged against the piston by the pressure of said supplying means and closing the port when the piston reaches a predetermined position, a second port in the cylinder opened by the piston when the piston reaches said predetermined position, a passage leading to the second port and means for selectively venting the second port or supplying the second port with fluid under pressure sufficient to overcome the urging means and move the piston to a second predetermined position.

14. The combination of a hydrodynamic device for transmitting torque from an input member driven by an engine to an output member, in combination, means including a movable adjusting element for varying the torque transmitted between the input and output members, the torque transmitting device including means for urging the adjusting element toward a first position providing one torque transmitting condition, and including an expansible chamber for opposing the urging means, the chamber including a piston traveling in a cylinder and connected to the adjusting element, a first port in the end of the cylinder, a slide valve in the cylinder adapted to control the port, means for supplying to the port fluid under pressure sufficient to overcome the urging means and move the piston to move the adjusting element, the slide valve being urged against the piston by the pressure of said supplying means and closing the port when the piston reaches a predetermined position, a second port in the cylinder opened by the piston when it reaches said predetermined position, a passage leading to the second port, means responsive to forward rotation of the output member for supplying to the passage fluid under pressure sufficient to overcome the urging means and move the piston to a second predetermined position, and control means connected to the engine and responsive to torque demand on the engine for interrupting the supply of liquid to the passage and venting said second port.

15. The combination of a hydrodynamic device which circulates liquid in a closed container to transmit torque from an input member located in the container and driven by an engine to a power output member located in the container, the device including a member in the container having adjustable blades whose position influences the torque between the input and output members, the blades being arranged to be urged toward low torque position by the hydraulic force of the circulating liquid, fluid pressure operated means for urging the blades to high torque position against the hydraulic force of circulating liquid with a force which increases with increasing torque demand on the engine, said fluid pressure operated means including a fluid pressure chamber and a source of fluid under pressure, control means connected to the engine and responsive to torque demand on the engine, means connected to said control means for varying, as a function of torque demand on the engine, the pressure of the source, and means connecting the source to said fluid pressure chamber.

16. The combination of a hydrodynamic device which circulates liquid in a closed container to transmit torque from an input member located in the container and driven by an engine to a power output member located in the container, the device including a member in the container having adjustable blades whose position influences the torque between the input and output members, the blades being arranged to be urged toward low torque position by the hydraulic force of the circulating liquid, a source of fluid pressure, fluid pressure operated means connected to the source for urging the blades toward high torque position against the hydraulic force of the circulating liquid, means for opposing the fluid pressure operated means to hold the blades in low torque positions, control means connected to the engine and responsive to torque demand on the engine, means connected to the control means for varying, as a function of torque demand, the pressure of the source, so as to vary the pressure in said fluid pressure operated means as a function of torque demand on the engine, and means responsive to torque demand on the engine for removing the opposing means.

17. The combination of a hydrodynamic device which circulates liquid in a closed container to transmit torque from an input member located in the container and driven by an engine to a power output member located in the container, the device including a member in the container having adjustable blades whose position influences the torque between the input and output members, the blades being arranged to be urged toward low torque position by the hydraulic force of the circulating liquid, a source of fluid under pressure, first fluid pressure operated means connected to the source for urging the blades toward high torque position against the hydraulic force of the circulating liquid, second fluid pressure operated means for connection to the source for opposing the first fluid pressure operated means to hold the blades in low torque position, control means connected to the engine and responsive to torque demand on the engine, means connected to the control means for varying, as a function of torque demand, the pressure of the source, so as to vary the pressure in said first fluid pressure operated means as a function of torque demand on the engine, and means connected to the control means and responsive to torque demand on the engine for venting the second fluid pressure operated means.

18. The combination of a hydrodynamic device which circulates liquid in a closed container to transmit torque from an input member located in the container and driven by an engine to a power output member located in the container, the device including a member in the container having adjustable blades whose position influences the torque between the input and output members, the blades being arranged to be urged toward low torque position by the hydraulic force of the circulating liquid, a source of pressure fluid connected to the container for supplying to the container liquid at a constant static pressure, control means connected to the engine and responsive to the torque demand on the engine, means connected to the control means for varying, as a function of torque demand, the pressure of the source whereby the source supplies to the container liquid at a pressure, which is a function of torque demand on the engine, and fluid pressure means operable by the liquid in the container for moving the blades to high torque position against the hydraulic force of the circulating liquid.

19. The combination of a hydrodynamic device which circulates liquid in a closed container to transmit torque from an input member located in the container and driven by an engine to a power output member located in the container, the device including a member in the container having adjustable blades whose position influences the torque between the input and output members, the blades being arranged to be urged toward low torque position by the hydraulic force of the circulating liquid, a source of fluid pressure connected to the container for supplying to the container liquid at a substantially constant static pressure, fluid pressure means operable by the liquid in the container for moving the blades to high torque position against the hydraulic force of the circulating liquid, and means for increasing the static pressure of liquid in the container in response to increase of torque demand on the engine.

20. The combination of a hydrodynamic transmission which circulates liquid in a closed container to transmit torque to a power output member in the container from an input member in the container and driven by an engine, the combination of an adjusting member in the container whose position influences the torque between the input and output members, a source of liquid under pressure connected to the container through an inlet passage, a discharge passage for liquid from the container, a pressure responsive release valve connected to the discharge passage to maintain normally a substantially constant pressure in the container, the controlling cross section of the discharge passage from the container to the release valve being no larger than the controlling cross section of the inlet passage, fluid pressure means operable by the pressure of liquid in the container for moving the adjusting member to increase the torque, control means connected to the engine and responsive to torque demand on the engine, and means connected to the control means for varying, as a function of torque demand, the pressure of the source whereby the pressure of the container is varied as a function of torque demand.

21. The combination of a hydrodynamic transmission which circulates liquid in a closed container to transmit torque to a power output member in the container from an input member in the container and driven by an engine, the combination of an adjusting member in the container whose position influences the torque between the input and output members, a source of liquid under pressure connected to the container through an inlet passage, a discharge passage for liquid from the container, a pressure responsive release valve connected to the discharge passage to maintain normally a substantially constant pressure in the container, the controlling cross section of the discharge passage from the container to the release valve being no larger than the controlling cross section of the inlet passage and the flow capacity of the discharge valve being greater than the flow capacity of the inlet passage, fluid pressure means operable by the pressure of liquid in the container for moving the adjusting member to increase the torque, control means connected to the engine and responsive to torque demand on the engine, and means connected to the control means for varying, as a function of torque demand, the pressure of the source whereby the pressure of the container is varied as a function of torque demand.

References Cited in the file of this patent

UNITED STATES PATENTS

| | | |
|---|---|---|
| 2,326,655 | Jandasek | Aug. 10, 1943 |
| 2,327,647 | Jandasek | Aug. 24, 1943 |
| 2,477,710 | Worstell | Aug. 2, 1949 |
| 2,482,249 | Court | Sept. 20, 1949 |
| 2,612,755 | Szczeniowski | Oct. 7, 1952 |

FOREIGN PATENTS

| | | |
|---|---|---|
| 1,002,800 | France | Nov. 7, 1951 |